United States Patent [19]

Valente et al.

[11] 4,271,752
[45] Jun. 9, 1981

[54] COFFEE MAKING ASSEMBLY

[76] Inventors: Paolo Valente; Taddeo Piloni, both of 30, Via Noccoli, Cremeno (Como), Italy

[21] Appl. No.: 28,090

[22] Filed: Apr. 9, 1979

[30] Foreign Application Priority Data

Apr. 12, 1978 [ES] Spain ........................... 235.333

[51] Int. Cl.³ .................................................. A47J 3/34
[52] U.S. Cl. .................................. 99/289 R; 99/302 R
[58] Field of Search ............. 99/289 R, 289 T, 289 D, 99/289 P, 302 R, 287

[56] References Cited

U.S. PATENT DOCUMENTS

| | | | |
|---|---|---|---|
| 2,907,266 | 10/1959 | Moulden | 99/289 R |
| 3,103,873 | 9/1963 | Breitenstein | 99/289 R |
| 3,369,478 | 2/1968 | Black | 99/289 R |
| 3,660,117 | 5/1972 | Neely | 99/289 R |

FOREIGN PATENT DOCUMENTS 1257604 12/1971 United Kingdom .

*Primary Examiner*—Robert W. Jenkins
*Attorney, Agent, or Firm*—Lerner, David, Littenberg & Samuel

[57] ABSTRACT

A coffee making assembly for automatic, domestic or bar coffee machines, having a fixed cylinder wherein two opposite pistons reciprocate in order to define an infusion chamber therein, the upper piston, in its upper dead center outside the cylinder, being horizontally translated by a support carrying a funnel adapted to be axially aligned with said cylinder in order to convey a pre-set toasted and powdered coffee dose therein. All movements of said pistons and support are controlled by levers and cams operated by a single motor shaft.

12 Claims, 11 Drawing Figures

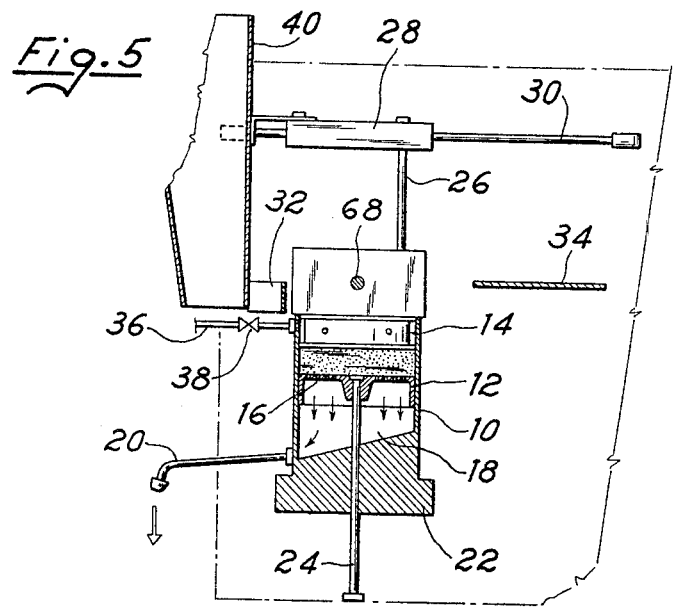
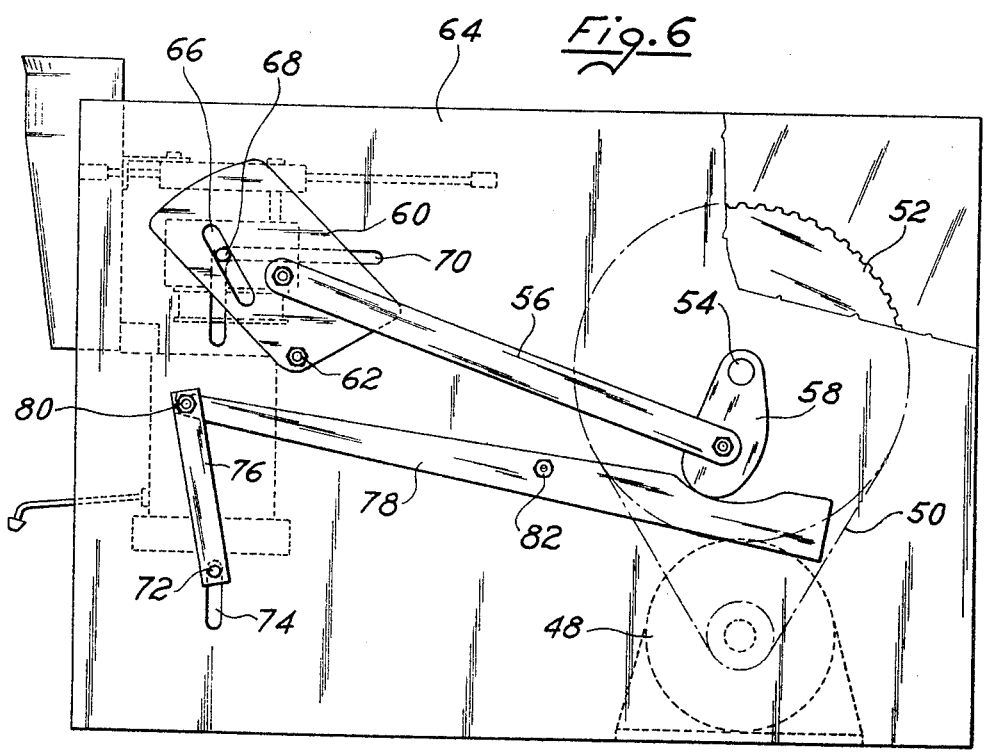

COFFEE MAKING ASSEMBLY

FIELD OF THE INVENTION

This invention relates to an assembly for preparing and delivering black coffee, by a controllable flow of hot water through a pre-set dose of toasted and powdered coffee, said assembly being usable for automatic coffee machines, as well as for bar or domestic coffee machines.

DESCRIPTION OF THE PRIOR ART

Said assembly comprises in a known manner a fixed cylinder wherein a first lower perforated piston vertically reciprocates between a lower position, wherein a coffee dose housing seat is defined in said cylinder, and an upper position aligned with the cylinder upper edge in order to draw off the dry tablet of exhausted coffee, while a second upper piston vertically reciprocates between a first lower position for sealingly closing the upper side of said coffee dose seat and a second position outside said cylinder, in order to make free the entrance to said seat, the assembly further comprising a pressure hot water feeding circuit for feeding hot water to said seat when in a closed condition and for delivering the beverage through the perforations of the lower piston to a collection and output duct. The known delivering assemblies of the above stated type, as usually operating in automatic coffee machines, all show different drawbacks, mainly due to their complex structure and to servicing difficulties in particular for the presence of a great number of electrovalves that are operated in sequence for controlling the various movements during a complete cycle of coffee preparation and output.

Further, these known assemblies are very expensive and operate at relatively low speed (of the order of one minute or more per cycle) with a relatively high consumption of toasted and powdered coffee and with a poor quality of the end product.

SUMMARY OF THE INVENTION

An object of this invention is to provide a black coffee delivering assembly wherein all drawbacks of known assemblies are positively avoided and wherein a black coffee beverage is obtained by a costless and simple mechanism which is easily serviceable, operates at high speed and in a noiseless manner with a reduced consumption of toasted and powdered coffee and a higher quality of beverage.

The above and further objects are essentially attained, according to this invention, due to the fact that the upper piston is connected to a support which accomplishes a horizontal reciprocating movement when the piston is outside the cylinder, said support further carrying a conveyor means for the toasted and powdered coffee dose in such a manner that said upper piston and said conveyor means alternately lie in an upper position aligned with said cylinder seat, respectively at each end of said support horizontal reciprocating movement.

BRIEF DESCRIPTION OF THE DRAWINGS

FIGS. 1 to 5 are diagrammatic views of the main assembly components as shown, in their different operative positions during a coffee making cycle, in a cross-section by a vertical plane comprising the axis of cylinder wherein said coffee is obtained.

FIGS. 6 and 7 are side views of the assembly showing the mechanical control means thereof in two different operative positions.

DESCRIPTION OF THE PREFERRED EMBODIMENT

Figure 1:
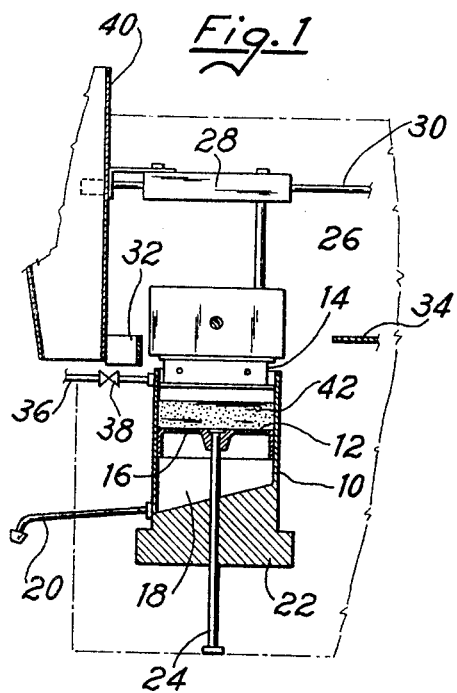

With reference to FIGS. 1 to 5, the shown assembly substantially comprises a fixed cylinder 10 wherein a coffee infusion is made and wherein sealingly slide two pistons, namely a lower piston 12 and an upper piston 14, said pistons reciprocating in a vertical direction. Piston 12 shows a perforated bottom, as in 16, so to allow communication with a underneath chamber 18 wherein the coffee infusion coming from the upper side of piston 12 is collected and then delivered through a duct 20. Said chamber 18 is closed in its lower side by means of a wall 22 in which a rod 24 for controlling the movements of piston 12 is sealingly reciprocable.

Piston 14, as will be more detailedly described later on, is slidably movable in a vertical direction on a guide rod 26 which is in turn fixed to a support 28 adapted to be moved in a horizontal direction along a fixed guide rod 30, the vertical stroke of piston 14 and the horizontal stroke of support 28, together with piston 14 when this latter lies at its top dead center, being defined by suitable stop devices. Said support 28 rigidly carries a conveyor element 40, f.i. in the form of a funnel, through which a pre-set dose of toasted and powdered coffee may be poured in a seat shown by the upper part of cylinder 10 when piston 12 is at its bottom dead center and piston 14 is spread apart from cylinder 10. Further, said conveyor element 40 shows a shaped projection 32 toward piston 14 acting as a scraper on the upper edge of cylinder 10.

Another scraper is formed by a fixed plate 34 along the path of the basis of piston 14.

The assembly further comprises a pressurized hot water feeding circuit, said water being fed to said cylinder 10 by means of a duct 36 comprising a valve 38.

The water penetrates, through piston 14, into cylinder 10 wherein said toasted and powdered coffee dose is housed, in order to form an infusion delivered by duct 20.

Figure 2:
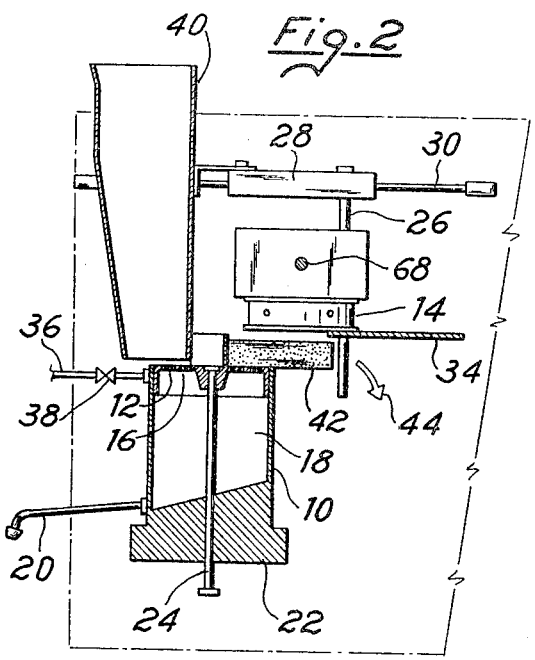

The operation of the shown assembly will be now described with reference to FIGS. 1 to 5. Starting from a rest position as shown in FIG. 1, wherein piston 14 is slightly raised from its bottom dead center in order to drain off pressure from the infusion forming chamber, the assembly is operated by an electric motor or any other suitable means in order to obtain a simultaneous lifting of both pistons 12 and 14 till their top dead centers. Then, maintaining piston 12 in said top dead center, support 28 is horizontally moved toward the right side in the drawings together with piston 14 and conveyor element 40. During said horizontal movement, as shown in FIG. 2, said scraper 32 moves away the tablet 42 of exhausted coffee as used in the preceding cycle. This tablet 42 was previously shifted to a position above the cylinder upper edge, due to lifting of piston 12, and the scraper motion allows to simultaneously clean the edge of cylinder 10 and upper surface of piston 12 from coffee residuals. Tablet 42 falls in a collecting box under the assembly, as shown by arrow 44.

During the above horizontal movement the lower surface of piston 14 slides in contact with a second fixed scraper 34 in order to clean said surface from coffee residuals in conditions of hindering the cycle movements or damage assembly components.

Figure 3:
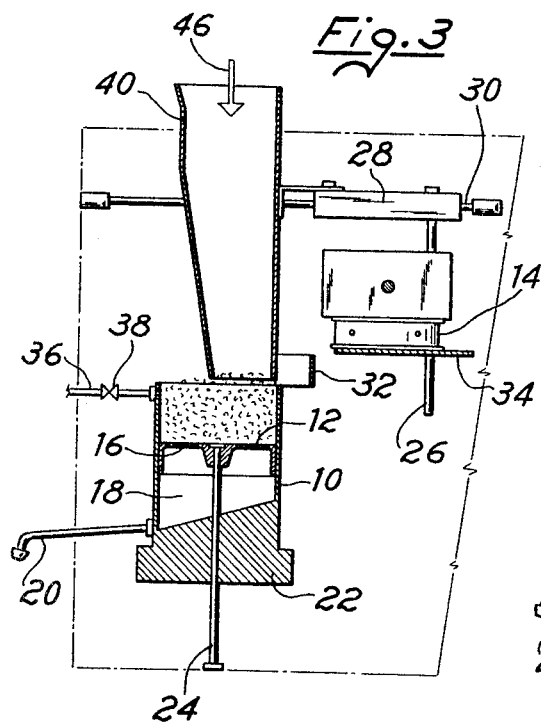

When said horizontal movement toward the right side in the drawing (FIG. 3) is finished, a pre-set dose of toasted and powdered coffee is fed through said conveyor 40, as shown by arrow 46, said dose having been previously powdered during the above described operations as shown in FIGS. 1 and 2. It is so attained a double advantage of avoiding any dead time and using a just powdered coffee, allowing a greater quality and quantity yield, or better allowing to obtain a high quality coffee infusion with a reduced volume or weight of the dose as necessary for preparing the infusion. Said dose falls, through the conveyor 40, into a seat as provided for in the upper part of cylinder 10 by a controlled motion of piston 12 until attaining its bottom dead center, said dose being preset in order to substantially fill said seat, as shown in FIG. 3.

Figure 4:
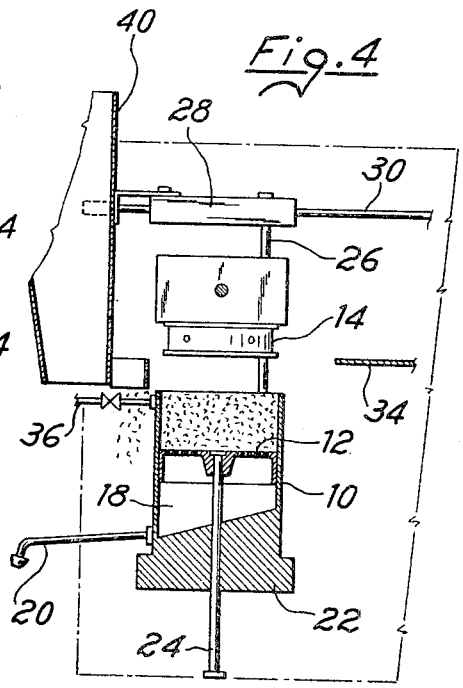
Figure 7:
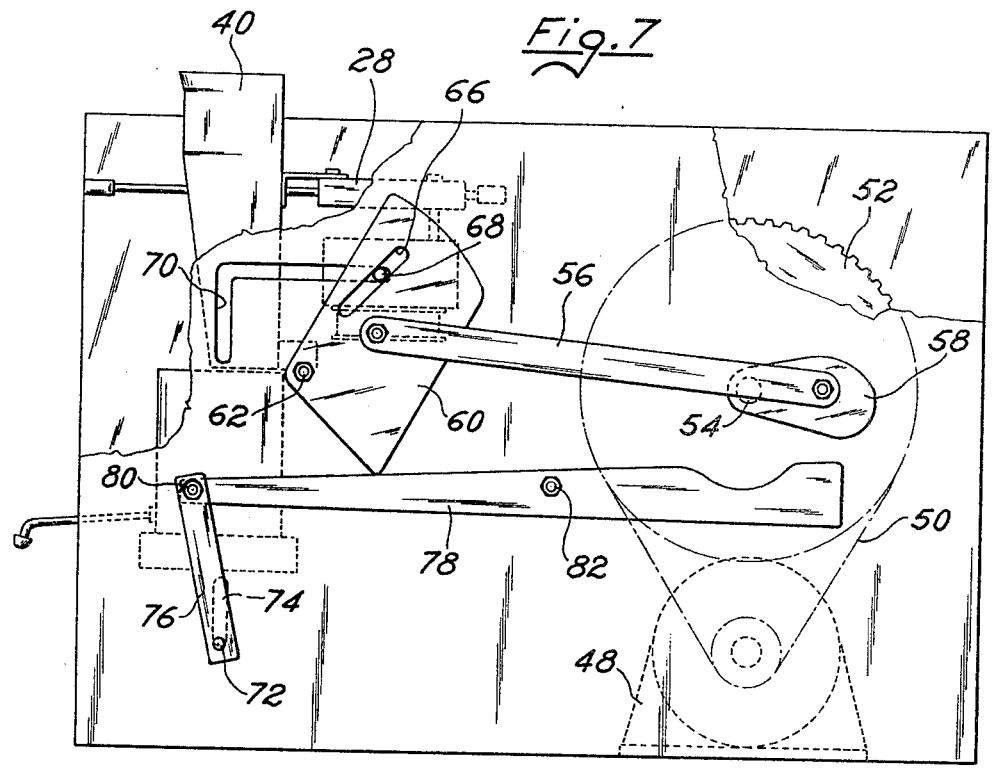
Figure 8:
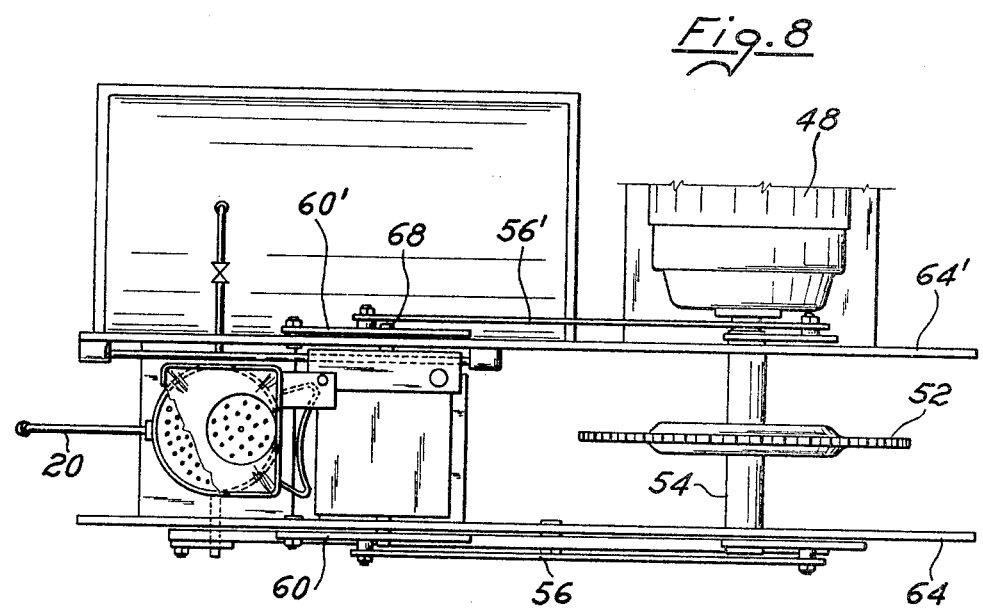
FIG. 8 is a partial top view of the same assembly.

When accomplished said seat filling operation, a return movement of support 28 is effected, in order to move said support 28 to its left end stroke position (as shown in the drawings) together with conveyor 40 and piston 14. During said return movement said scraper 32 further cleans the upper edge of cylinder 10 from any powdered coffee residual that could damage gaskets of piston 14. At the end of said horizontal return stroke, said piston 14 is exactly coaxially aligned with cylinder 10 and said conveyor 40 lies in a rest position (FIG. 4). Piston 14 is then lowered and inserted into cylinder 10 until attaining a bottom dead center as shown in FIG. 5, wherein the upper portion of cylinder 10 is sealingly closed with partial compression of said toasted and powdered coffee dose. At the end of this motion, pressurized hot water is injected, through valve 38 and piston 14, into said coffee dose within cylinder 10, wherein said water is mixed with coffee in order to form the infusion delivered through chamber 18 and duct 20. The water injection may be volumetrically controlled by a hand operating device or by an electric operating device comprising at least a timer. When the coffee delivering is over, piston 14 is slightly raised until the position of FIG. 1, in order to discharge pressure within the infusion chamber and in preparation to a new cycle. The above cited movements of pistons 12,14 and support 28 are advantageously effected by a mechanical drive with one motor only, as shown in FIGS. 6, 7 and 8. More exactly, said motor 48 moves, by means of a belt 50 and a pulley 52, a shaft 54 from which all motions are derived.

This shaft 54 drives, through a connecting rod 56 and a crank 58, a shaped plate 60, which is pivoted at 62 to an assembly support wall 64 and shows a groove 66 wherein a pin 68 is engaged, said pin crossing the upper portion of piston 14 and being guided into a L-shaped groove 70 into said wall 64. Accordingly, at each revolution of shaft 54 said pin 68 effects a complete stroke in both directions along the groove 70 in order to control the motions of piston 14 and support 28 during the above described operating cycle.

Of course, as it can be seen for instance in FIG. 8, said lever drive may be advantageously duplicatd on the other side of assembly, where a second support wall 64' is provided for and where the same operating drive components are symmetrically arranged as shown by the same and apexed reference numerals.

The vertical reciprocating motions of lower piston 12 are guided by means of a pin 72 rigidly connected with the above described control rod 24 and movable within a groove 74 of the support walls 64 and 64'. Said pin 72 is controlled in its motions by a lever 76 swingingly mounted at one end on pin 72 and pivoted at the other end, as in 80, to a swinging arm 78 pivoted as in 82 to the wall 64 and showing suitably shaped surfaces for the driving thereof by said cam-shaped plate 60 and by a shaped projection of crank 58 in order to respectively obtain a lowering and a raising motion of piston 12. In FIG. 6, said piston 12 is completely raised, while in FIG. 7 piston 12 is completely lowered.

Of course the above described operative cycle, comprising stops in given positions, namely the positions wherein the powdered coffee dose and respectively the pressurized hot water are fed, as well as the cycle end position, is controlled by a plurality of switches and the like which operate also for controlling additional operations, as coffee powdering and water timed feeding, according to the cycle stops. These switches and controls are operated in a well known and then not shown manner, by a series of cams and microswitches, said cams being preferably fastened to the main shaft 54.

Figure 9:
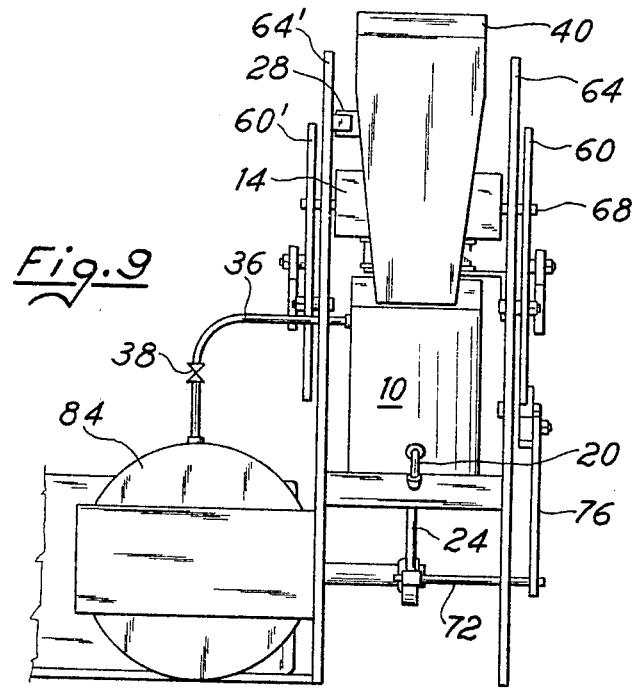
FIG. 9 is a front view of the assembly.

FIG. 9 is a front view of the assembly, wherein the above described components are shown, together with a boiler 84 as used for warming water until a suitable temperature for coffee infusion.

Figure 10:
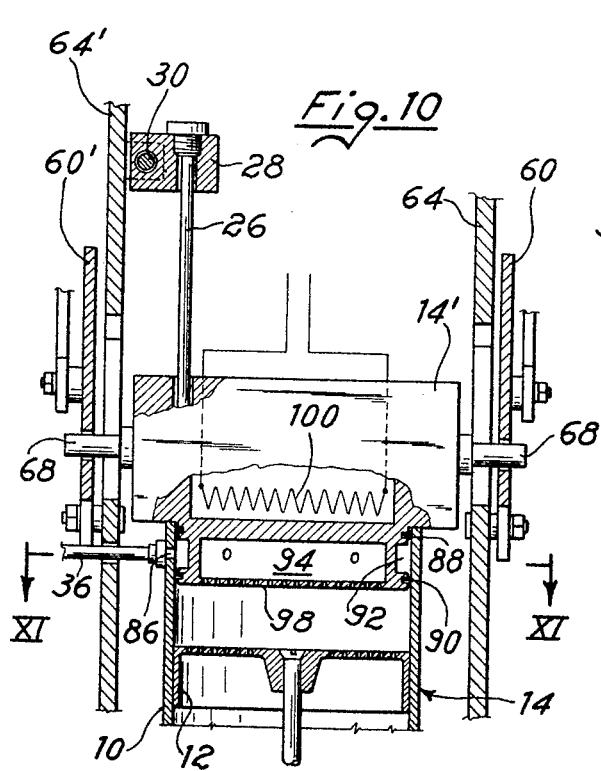
FIG. 10 is a cross-sectional view in a scale greater than that of the preceding figures, along a plane containing the axis of said cylinder and perpendicular to the section plane of FIGS. 1 to 5.
Figure 11:
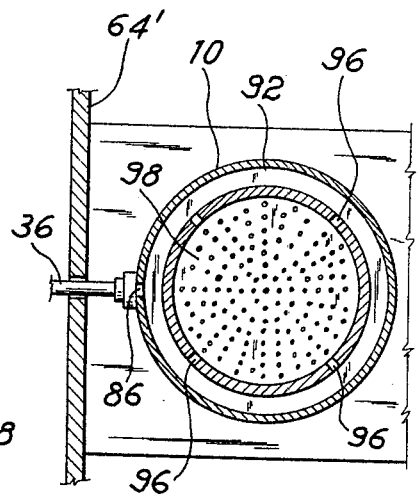
FIG. 11 is a partial cross-section along the plane XI—XI of FIG. 10.

The hot water is advantageously fed, under control of valve 38, as shown in FIGS. 10 and 11. According to these figures, hot water is fed by duct 36 to at least one bore 86 in a cylinder wall zone as comprised between two axially spaced sealing gaskets 88 and 90 which are carried by the wall of piston 14 when this latter is in its bottom dead center as shown in FIG. 10. The hot water coming from bore or bores 86 is then circumferentially distributed in a groove 92 as shown by the piston head and from which it penetrates the piston through bores 96 into a piston inner chamber 94, said bores 96 being preferably shifted with respect to bore 86. From chamber 94 the hot water is then distributed as a shower on the powdered coffee dose through a plurality of bores 98 in the basis of upper piston 14, in order to form the infusion and deliver the same as previously stated.

The above particular distribution of pressurized hot water, with a labyrinth path having numerous direction changes allows to avoid the formation of water jets which may "perforate" the powdered coffee and do not exploit the same. The shown water distribution allows to avoid preferential paths and to obtain a "shower" calibrated distribution of water on the coffee, so that this latter is completely "exhausted" and then the weight of its dose may be reduced without impairing the infusion quality. As shown in FIG. 10, piston 14 shows a warming electrical resistance 100 in its upper portion 14', said resistance being able, together with possible further warming means (not shown), to maintain the mechanical components at a suitable temperature for making coffee, independently from the intervals between the operating cycles.

It is to be noted that the operating cycle may be carried-out in a period which is about ⅓ of the period as required by known assemblies of this type, in a particularly noiseless device and with a very good product quality, as well as with a dose weight reduction of about 20%, due both to the fact that a just powdered coffee dose is used and to the fact that the water path allows to completely exploit said dose.

It is to be understood that many modifications could be carried out to the described embodiment without departing from the spirit and scope of this invention.

We claim:

1. Apparatus for preparing and delivering a coffee infusion comprising a fixed cylinder including a first end and a second end, said fixed cylinder including an upper rim located at said first end thereof, a first piston mounted for reciprocation within said fixed cylinder between a first position within said cylinder and displaced from said upper rim at said first end of said cylinder so as to define a predetermined coffee dose volume between the upper face of said first piston and said upper rim of said fixed cylinder, and a second position in alignment with said upper rim of said fixed cylinder, a second piston mounted for reciprocation in the plane of said fixed cylinder between a first position at said upper rim of said fixed cylinder so as to sealingly close said predetermined coffee dose volume and a second position outside of said fixed cylinder so as to permit access to said predetermined coffee dose volume, means for supplying pressurized hot water to said predetermined coffee dose volume when said second piston is in said first position, duct means for collecting and delivering coffee produced in said predetermined coffee dose volume from said second end of said fixed cylinder, reciprocating support means for said second piston whereby said second piston may be reciprocated from said second position in said plane of said cylinder to a third position outside of said plane of said cylinder, conveyor means carried by said support means whereby when said second piston is in said third position said conveyor means is aligned with said cylinder so that a predetermined coffee dose may be conveyed to said fixed cylinder thereby, motor means, including a motor shaft, and mechanical control means for reciprocating said second piston and said reciprocating support means upon rotation of said motor shaft, said mechanical control means comprising a support wall mounted adjacent to said plane of said cylinder, said support wall including support wall guide means, a control plate pivotally mounted on said support wall, pin means connected to said second piston for guiding said piston upon rotation of said motor shaft by cooperation of said pin means with said support wall guide means and said control plate, and connection means for causing said control plate to reciprocate in response to rotation of said motor shaft.

2. The apparatus of claim 1 wherein said support wall guide means comprises an L-shaped groove formed in said support wall.

3. The apparatus of claim 2 wherein said connecting means comprises a crank member connected to said motor shaft for rotation therewith, and a connecting arm member pivotally connected to said crank member and said control plate.

4. The apparatus of claim 1 wherein said mechanical control means comprises first mechanical control means, and including second mechanical control means for reciprocating said first piston upon rotation of said motor shaft.

5. The apparatus of claim 4 wherein said second mechanical control means comprises second support wall guide means comprising slot means in said support wall, second pin means connected to said first piston for guiding said first piston upon rotation of said motor shaft by cooperation of said second pin means with said second support wall guide means, and second connecting means for causing said second pin means to reciprocate upon rotation of said motor shaft.

6. The apparatus of claim 5 wherein said second connecting means comprises an oscillating arm member pivotally connected to said support wall, said oscillating arm member including a first end and a second end, said first end of said oscillating arm member being oscillated by contact with said crank member, and a lever member connecting said second pin means to said second end of said oscillating arm member.

7. The apparatus of claim 6 wherein said control plate includes a cam portion, and wherein said second end of said oscillating arm member is further controlled by intermittent contact with said cam portion of said control plate.

8. The apparatus of claim 1 wherein said upper face of said first piston includes a plurality of apertures substantially covering the surface thereof thereby forming a filter through which said coffee produced in said predetermined coffee dose volume passes prior to its delivery to said duct means.

9. Apparatus for preparing and delivering a coffee infusion comprising a fixed cylinder including a first end and a second end, said fixed cylinder including an upper rim located at said first end thereof, a first piston mounted for reciprocation within said fixed cylinder between a first position within said cylinder and displaced from said upper rim at said first end of said cylinder so as to define a predetermined coffee dose volume between the upper face of said first piston and said upper rim of said fixed cylinder, and a second position in alignment with said upper rim of said fixed cylinder, a second piston mounted for reciprocation in the plane of said fixed cylinder between a first position at said upper rim of said fixed cylinder so as to sealingly close said predetermined coffee dose volume and a second position outside of said fixed cylinder so as to permit access to said predetermined coffee dose volume, means for supplying pressurized hot water to said predetermined coffee dose volume when said second piston is in said first position, duct means for collecting and delivering coffee produced in said predetermined coffee dose volume from said second end of said fixed cylinder, reciprocating support means for said second piston whereby said second piston may be reciprocated from said second position in said plane of said cylinder to a third position outside of said plane of said cylinder, conveyor means carried by said support means whereby when said second piston is in said third position said conveyor means is aligned with said cylinder so that a predetermined coffee dose may be conveyed to said fixed cylinder thereby, motor means including a motor shaft, mechanical control means for reciprocating said second piston and said reciprocating support means upon rotation of said motor shaft, and a fixed scraper member located adjacent to the path of reciprocation of said second piston whereby when said second piston moves from said second position to said third position said fixed scraper member passes across the face of said second piston.

10. The apparatus of claim 9 including a scraper member carried by said conveyor means and aligned with said upper rim of said fixed cylinder whereby reciprocation of said support means from said second position to said third position causes said scraper member to pass across the upper surface of said upper rim of said fixed cylinder.

11. Apparatus for preparing and delivering a coffee infusion comprising a fixed cylinder including a first end and a second end, said fixed cylinder including an upper rim located at said first end thereof, a first piston mounted for reciprocation within said fixed cylinder between a first position within said cylinder and displaced from said upper rim at said first end of said cylinder so as to define a predetermined coffee dose volume between the upper face of said first piston and said upper rim of said fixed cylinder, and a second position in alignment with said upper rim of said fixed cylinder, a second piston mounted for reciprocation in the plane of said fixed cylinder between a first position wherein at least a portion of said second piston projects below said upper rim of said fixed cylinder so as to sealingly close said predetermined coffee dose volume at said upper rim of said fixed cylinder and a second position outside of said fixed cylinder so as to permit access to said predetermined coffee dose volume, means for supplying pressurized hot water to said predetermined coffee dose volume when said second piston is in said first position, said means for supplying pressurized hot water comprising hot water inlet means passing through said fixed cylinder at a point corresponding with said portion of said second piston which projects below said upper rim of said fixed cylinder, said second piston including a circumferential distribution groove around the periphery of said second piston and said portion of said second piston which projects below said upper rim of said fixed cylinder when said second piston is in said first position, said hot water inlet means being in fluid communication with said circumferential distribution groove, said second piston further including an inner cavity surrounded by said circumferential distribution groove and defined by an inner cavity wall therebetween, said inner cavity and said circumferential distribution groove being in fluid communication by means of a plurality of radial passages passing through said inner cavity wall, the face of said second piston further comprising a plurality of apertures communicating with said inner cavity so as to evenly distribute said pressurized hot water from said inner cavity to said predetermined coffee dose volume, duct means for collecting and delivering coffee produced in said predetermined coffee dose volume from said second end of said fixed cylinder, reciprocating support means for said second piston whereby said second piston may be reciprocated from said second position in said plane of said cylinder to a third position outside of said plane of said cylinder, conveyor means carried by said support means whereby when said second piston is in said third position said conveyor means is aligned with said cylinder so that a predetermined coffee dose may be conveyed to said fixed cylinder thereby, motor means including a motor shaft, and mechanical control means for reciprocating said second piston and said reciprocating support means upon rotation of said motor shaft.

12. The apparatus of claim 10 wherein said plurality of radial passages are offset with reference to the location of said hot water inlet means.

* * * * *